United States Patent Office 3,795,729
Patented Mar. 5, 1974

3,795,729
PROCESS FOR THE PRODUCTION OF FOAMED POLYSTYRENE MATERIALS
Hiroshi Asakura, Kanagawa, and Koshi Takano, Yashuaki Arai, and Masaharu Kusaka, Kamakura, Japan, assignors to Denki Kagaku Kogyo Kabushiki Kaisha, Yuraku-cho, Chiyoda, Tokyo-to, and Toyo Kagaku Kabushiki, also known as Toyo Chemical Co., Ltd., Kamakura-shi, Kanagawa-ken, Japan
Continuation-in-part of abandoned application Ser. No. 789,511, Jan. 7, 1969. This application Nov. 29, 1971, Ser. No. 202,985
Int. Cl. B29d 27/00; B29f 3/03
U.S. Cl. 264—54                 5 Claims

ABSTRACT OF THE DISCLOSURE

A polystyrene resin containing a foaming agent is extruded through a die with a simple aperture which will not cause irregular resin flow such that resin foams to a cross sectional area at most 6.5 times that of the die aperture, the resulting foamed material is forced through a sizing gate of a cross sectional area 1.5 to 6.5 times that of the die aperture while the foaming agent is still actively decomposing, and the foamed material thus sized is then cooled and set.

REFERENCE TO RELATED APPLICATION

This application is a continuation-in-part of our copending application Ser. No. 789,511 filed Jan. 7, 1969 for "Foamed Polyester Materials and Production Thereof" and now abandoned.

BACKGROUND OF THE INVENTION

This invention relates to foamed products in the form of structure made up of closed cells produced by melt extrusion and more particularly to a new process for producing foamed polystyrene materials made up of uniform foam globules and having a smooth surface, accurate corner formation, and wood-like appearance and characteristics.

Heretofore, foamed polystyrene materials of this character produced by melt extrusion and having low densities corresponding to specific gravities of the order of from 0.10 to 0.15 have generally been used. These materials are formed by extrusion through dies having apertures conforming to the cross sections of the desired products of these materials. For this purpose, much time and expenditure are needed for the design and fabrication of the dies.

These dies are cooled to an extreme degree during extrusion to prevent the articles undergoing extrusion from being swelled by gas pressure therewithin as they are extruded through the dies. For this reason, these articles are formed at output rates far below the true capacities of the extruding machines, whereby not only is the extruding capacity in each case greatly lowered, but the mechanical life of the equipment is also greatly reduced.

Furthermore, in a product formed by such a method, excellent surface luster and accurate corner formation, which are desirable features, cannot be attained, and there is no possibility whatsoever of producing an extrudible material having the appearance and characteristics of wood, that is, a foamed polystyrene product of a specific gravity of the order of from 0.2 to 0.8.

SUMMARY OF THE INVENTION

It is an object of the present invention to overcome the above described difficulties and to provide a process for producing foamed polystyrene materials having excellent surface luster and smoothness, accurate corner formation, an aesthetically pleasing appearance and characteristics of wood and having various desired shapes ranging from simple to relatively complex cross sections such as sheets and plates, bars, channels, angles, polygons, and rails.

Another object of the invention is to provide a process adapted to make a low-priced material which is highly suitable for use in place of wood materials which are becoming increasingly expensive because of diminishing forest resources and the scarcity of persons skilled in woodworking.

Still another object of the invention is to provide a process as set forth hereinabove which can be carried out in a simple manner with relatively simple equipment and can be readily adapted to continuous and automatic operation.

According to the present invention, briefly summarized, there is provided a process for producing foamed polystyrene materials of the character referred to above which is characterized by the steps of extruding a polystyrene resin containing a foaming agent through at least one die having a simple aperture configuration which will not cause irregular resin flow, forcing the resulting foamed material through a sizing gate while the foaming agent is still active therewithin, and then cooling and setting the material.

The nature, principle, details, and utility of the invention will become clearly apparent from the following detailed description with respect to examples of preferred embodiment of the invention when read in conjunction with the accompanying drawings, in which like parts are designated by like reference numerals.

DETAILED DESCRIPTION

Figure 1:
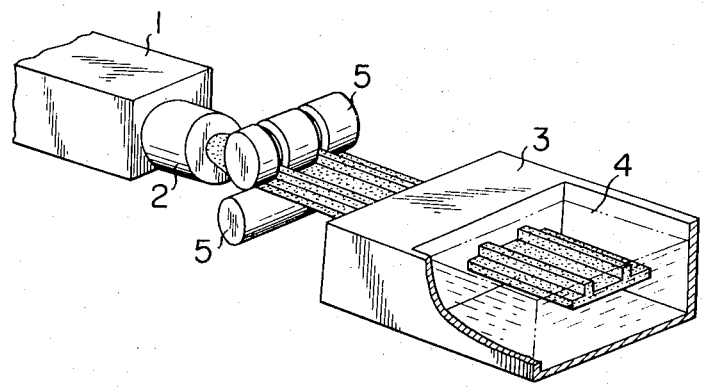
FIG. 1 is a diagrammatic perspective view, with parts cut away, indicating an example of one embodiment of the invention.
Figure 2:
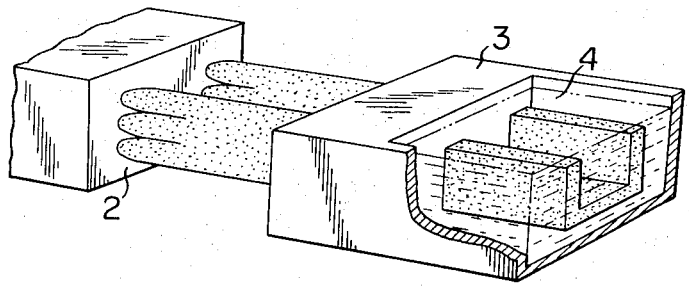
FIG. 2 is a view similar to FIG. 1 indicating an example of another embodiment of the invention.

Referring to the drawings, a polystyrene blend with a foaming agent admixed therewith is supplied to an extruder 1 and is heated and kneaded therein to become a molten or softened resin material. This material is discharged through a die 2 which is simply fabricated and has a shape such that it will not give rise to irregularities in the flow of the molten resin while restricting the foaming so that merely the formation of foam nuclei is caused within the extruder by the internal pressure. The resin is then extruded while it is caused to foam so that, at the stage wherein pressure is removed, the maximum cross sectional area of the foamed resin is 6.5 times, preferably from 2.5 to 6.5 times, that of the cross sectional area of the die aperture.

The foamed structure thus extruded differs greatly from the structure which is almost fully solidified as it is discharged from the die as in the ordinary extrusion procedure. The foamed structure extruded in the above described manner is a thermoplastic substance containing gas bubbles and does not flow and drop, having a material structure in the state of bread dough or plasticine with elasticity due to so-called resin internal gas pressure.

Therefore, this foamed material is in the most desirable state for forming the desired product, that is, in a state whereby forming is possible by techniques employed in clay work.

The foamed material thus extruded is next subjected, or not subjected, to drafting while the interior thereof is a state wherein the foaming agent is still decomposing and is swelling because of gas. The foamed material is then forced through a sizing gate 3 having cross sectional area of aperture which is from 1.5 to 6.5 times that of the die 2, the resin being spread to all corners of the sizing gate 3 by the gas pressure within the molten resin interior.

However, the aforementioned requirements of accurate corner formation, excellent surface lustre, and appearance and characteristics of wood impose limitations on the relationship between the aperture areas of the die and sizing gate, that is, the deformation ratio. The results of experiments which we have carried out with respect to this problem are set forth in Tables 1 and 2.

of order of from 1.5 to 6.5 times the die aperture area is desirable. When such an area relationship is used, the foamed material is caused by gas pressure to expand and spread into all corners of the sizing gate 3. The material is then cooled and set in a cooling bath 4.

The term "polystyrene" as herein used refers collectively to resins produced by causing monomers such as acrylonitrile and butadiene to copolymerize with styrene as, for example, acrylonitrilestyrene (AS) copolymers, acrylonitrile-butadienestyrene copolymers, and impact resistive polystyrenes for impact resistance, in addition to polystyrene homopolymers.

Among the foaming agents considered to be effective in the extrusion of polystyrene foamed materials, there are hydrocarbon gases developed for use in forming with high foaming and solid foaming agents used for formed articles of materials such as rubbers and polyvinyl chlorides.

Solid foaming agents are preferable in the practice of the present invention for convenience in storage and form-

TABLE 1

| Gate size (mm.) | Area (mm.²) | Die diameter (mm.) | | | | | | | | | | | | | | | | |
|---|---|---|---|---|---|---|---|---|---|---|---|---|---|---|---|---|---|---|
| | | 2.5 | | 3.0 | | 3.5 | | 6.0 | | 8.0 | | 10.5 | | 15 | | 30 | | 35 |
| | | Area (mm.²) | | | | | | | | | | | | | | | | |
| | | 4.9 | | 7.1 | | 9.6 | | 28.3 | | 50.2 | | 86.5 | | 176.6 | | 706.5 | | 961.6 |
| | | Quantity of foaming agent (parts) | | | | | | | | | | | | | | | | |
| | | 0.5 | 1.0 | 0.5 | 1.0 | 0.5 | 1.0 | 0.5 | 1.0 | 0.5 | 1.0 | 0.5 | 1.0 | 0.5 | 1.0 | 0.5 | 1.0 | 0.5 | 1.0 |
| 4×4 | 16 | ○ | ○ | ○ | ○ | ○ | ○ | △ | | | | | | | | | | | |
| 4×6 | 24 | | △ | ○ | ○ | ○ | ○ | ○ | △ | | | | | | | | | | |
| 5×7 | 35 | | △ | ○ | ○ | ○ | ○ | ○ | △ | | | | | | | | | | |
| 10×7 | 70 | | | | | | △ | ○ | ○ | ○ | △ | | | | | | | | |
| 15×7 | 105 | | | | | | △ | ○ | ○ | ○ | ○ | ○ | △ | | | | | | |
| 14×8 | 112 | | | | | | △ | ○ | ○ | ○ | ○ | ○ | △ | | | | | | |
| 20×7 | 140 | | | | | | △ | ○ | ○ | ○ | ○ | ○ | ○ | ○ | △ | | | | |
| 25×6 | 150 | | | | | | △ | ○ | ○ | ○ | ○ | ○ | ○ | ○ | △ | | | | |
| 17×10 | 170 | | | | | | | △ | ○ | ○ | ○ | ○ | ○ | ○ | △ | | | | |
| 25×7 | 175 | | | | | | | | △ | ○ | ○ | ○ | ○ | ○ | △ | | | | |
| 14×14 | 196 | | | | | | | | △ | ○ | ○ | ○ | ○ | ○ | △ | | | | |
| 30×7 | 210 | | | | | | | | △ | ○ | ○ | ○ | ○ | ○ | △ | | | | |
| 35×7 | 245 | | | | | | | | △ | ○ | ○ | ○ | ○ | ○ | △ | | | | |
| 35×9 | 315 | | | | | | | | △ | ○ | ○ | ○ | ○ | ○ | ○ | △ | | | |
| 35×10 | 350 | | | | | | | | | | △ | ○ | ○ | ○ | ○ | ○ | △ | | |
| 36×12 | 432 | | | | | | | | | | △ | ○ | ○ | ○ | ○ | ○ | △ | | |
| 30×15 | 450 | | | | | | | | | | △ | ○ | ○ | ○ | ○ | ○ | △ | | |
| 42×11 | 462 | | | | | | | | | | △ | ○ | ○ | ○ | ○ | ○ | △ | | |
| 45×11 | 495 | | | | | | | | | | △ | ○ | ○ | ○ | ○ | ○ | △ | | |
| 25×20 | 500 | | | | | | | | | | △ | ○ | ○ | ○ | ○ | ○ | △ | | |
| 42×12 | 504 | | | | | | | | | | △ | ○ | ○ | ○ | ○ | ○ | △ | | |
| 47×11 | 517 | | | | | | | | | | △ | ○ | ○ | ○ | ○ | ○ | △ | | |
| 150×10 | 1,500 | | | | | | | | | | | | | | △ | ○ | ○ | △ | |
| 150×15 | 2,250 | | | | | | | | | | | | | | △ | ○ | ○ | ○ | ○ |
| 200×20 | 4,000 | | | | | | | | | | | | | | △ | ○ | ○ | ○ | ○ |

NOTE.—The above results indicate the forming limits imposed on the die area by the deformation ratio of the sizing gate area in the formation of a square-shaped article from a circular die. Symbol ○ indicates accurate corner formation. Symbol △ indicates accurate corner formation but no stability. Blank spaces indicate conditions under which accurate corner formation cannot be attained.

TABLE 2

| Upper side × lower side × height (mm.) | Area (mm.²) | Die diameter (mm.) | | | | | | | |
|---|---|---|---|---|---|---|---|---|---|
| | | 2.5 | | 3.0 | | 3.5 | | 6.0 | |
| | | Area (mm.²) | | | | | | | |
| | | 4.9 | | 7.1 | | 9.6 | | 28.3 | |
| | | Quantity of foaming agent (parts) | | | | | | | |
| | | 0.5 | 1.0 | 0.5 | 1.0 | 0.5 | 1.0 | 0.5 | 1.0 |
| 4×5×4 | 18 | ○ | ○ | ○ | ○ | ○ | ○ | | |
| 6×7×4 | 26 | ○ | ○ | ○ | ○ | ○ | ○ | △ | |
| 7×8×5 | 37.5 | | △ | ○ | ○ | ○ | ○ | △ | |
| 9×12×7 | 73.5 | | | | | | △ | ○ | ○ |
| 12×15×8.5 | 114.75 | | | | | | △ | ○ | ○ |

NOTE.—The above results indicate the forming limits imposed on the die area by the deformation ratio of the sizing gate in the case when an article having a cross section of a trapezoid (trapezium) shape is formed from a circular die. Symbol ○ indicates accurate corner formation. Symbol △ indicates accurate corner formation but no stability. Blank spaces indicate conditions under which accurate corner formation cannot be attained.

From the results as set forth in Tables 1 and 2, it is apparent that a cross sectional area on the sizing gate 3 ing. Examples of the most suitable foaming agents are azodicarbonamide, toluenesulphohydrazide, benzene-1, 3-disulphohydrazide, diphenyloxy-4, 4'-disulphohydrazide, N,N'-dinitrosopentamethylenetetramine, nitrourea and tert-butylaminenitryl.

Furthermore, auxiliary foaming agents may also be used to cause the foam globules to be uniform and the surface state to be smooth. Examples of such auxiliary agents are oxalic acid, citric acid, guanidine carbonate, anhydrous potassium carbonate, zinc chloride, succinic acid, lactic acid, orthophosphoric acid, borax, cadmium oxide, zinc dust, barium stearate, magnesium oxide, aluminium stearate, calcium carbonate, lead acetate, zinc oxide, calcium stearate, aluminium oxide, urea stearate, and zinc laurate.

For reasons arising from the process operation wherein the foaming is limited to the formation of foam nuclei within the extruder 1 and die 2, and foaming is freely permitted as the resin material is discharged from the die 2, the preferable temperatures of the extruder cylinder and die are within the following ranges, wherein $C_1$, $C_2$, and $C_3$ represent the temperature in the feed zone, compression zone, and melt zone, respectively, of the cylinder of the screw extruder according to conventional designation and $D_3$, $D_2$, and $D_1$ represent the temperature at the base, middle, and end, respectively, of the die following the same convention.

Cylinder temperature: °C.
$C_1$ ------------------------------- 110 to 180
$C_2$ ------------------------------- 130 to 230
$C_3$ ------------------------------- 130 to 230
Die temperature:
$D_1$ ------------------------------- 110 to 135
$D_2$ ------------------------------- 115 to 160
$D_3$ ------------------------------- 125 to 170

Furthermore, irrespective of the shape (square, rectangular, triangular, or irregular as in the case of a rail) of the foamed polystyrene material, a shape of the aperture of the die 2 which does not cause flow irregularities of the molten resin and is simple to facilitate die fabrication is used in all cases. Examples of such simple die aperture shapes are circular, elliptical, and cylindrical (this die being used for producing all hollow shapes and solid shapes).

Figure 4:
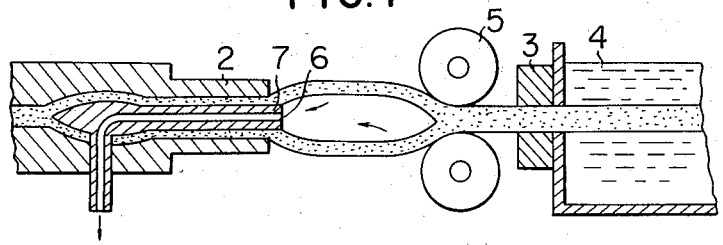

According to the invention, the foamed material extruded through the die 2 may be fed directly to the sizing gate 3 as described above. However, in the case of a material of irregular cross sectional shape which differs extremely from that of the die aperture as illustrated in FIGS. 1 and 4, the foamed material may first be preformed by means of sizing rolls 5 of profile approaching the cross sectional shape of the objective material to thereby facilitate the entrance into and passage through the sizing gate 3 of the foamed material, whereby formability thereof is further improved.

The effectiveness of the above mentioned sizing rolls 5 for improving the formability of the foamed material may be illustrated by the following example. 100 parts of a polystyrene to which 0.5 part of azodicarbonamide had been added was melted, kneaded, and extruded by means of an extruder 1 provided successively with circular dies 2 of respectively different aperture areas and operated with a cylinder temperature in the zone of $C_3$ of 190 degrees C and a die temperature in the zone of $D_1$ of 125 degrees C.

The foamed materials thus extruded were subjected to preshaping by sizing rolls 5 and then forced through square sizing gates 3 of various sizes of form respective square bars, which were examined for an evaluation of the effectiveness of the sizing rolls 5. The conditions and results of this test are set forth in Table 3.

TABLE 3

| Die size DS (mm.) | Gate size GS (mm.) | Deformation ratio (GS/DS) | Sizing role effectiveness |
|---|---|---|---|
| 2.5 | 4×4 | 2.03 | X |
| 3.5 | 5×7 | 3.18 | X |
| 6.0 | 15×7 | 5.57 | X |
| 8.0 | 30×7 | 8.35 | X |
| 10.5 | 35×10 | 10.61 | X |
| 30.0 | 150×10 | 15.92 | O |
| 35.0 | 200×20 | 36.39 | O |

Note.—Symbol X=Not effective; Symbol O=Effective.

As indicated by the results in Table 3, it appears that, in the extrusion from a die 2 of large size, the foaming states of the surface and interior of the molten resin at the tip of the die differ, the interior part undergoing foaming to a greater extent, and surplus foaming gas generated in the interior accumulates and ruptures the outer surface of the molten resin.

As also indicated by the results in Table 3, in a shaped article subjected to a high degree of deformation in the sizing gate 3 after extrusion, the internal foaming gas is forced out through the surface by the forceful pressure accompanying the deformation. Accordingly, it is extremely difficult to obtain a product having the desired surface smoothness and accurate corner formation through the use of only a sizing gate.

As a result of various experiments and research we have carried out with respect to this point, we have succeeded in producing foamed polystyrene materials having smooth surfaces, accurate corner formation, and fine wood-like texture and characteristics when worked through large-diameter dies or when subjected to deformation of high deformation ratio due to sizing after forming. This has been accomplished by first mounting a tubular mandrel within a round die and passing through a torpedo thereby to extract surplus foaming gas.

Figure 3:
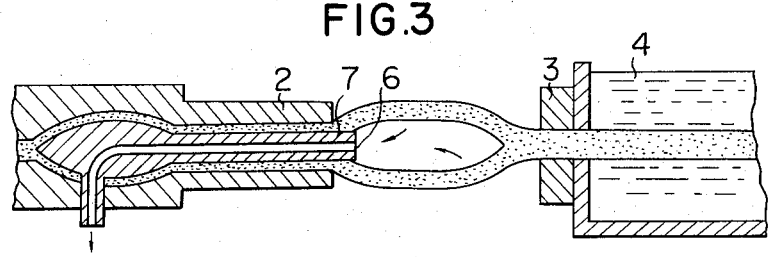
FIGS. 3 and 4 are diagrammatic side elevations illustrating still other embodiments of the invention, in which a tubular mandrel is used within a tubular die.

The removal of the surplus foaming gas is accomplished in the manner described below with reference to FIGS. 3 and 4. The polystyrene blended material containing a foaming agent admixed therewith is supplied to the extruder to be heated and kneaded into a molten resin material. Then, as foaming of this molten material is suppressed by the internal pressure, this resin is extruded through a die 2 of tubular shape having an annular or tubular aperture formed between the inner wall surface of the die and the outer wall surface of a tubular mandrel 7. The mandrel 7 has through its center a gas discharge hole 6 passing through the extruder 1 and communicating with a region outside of the machine and is coaxially disposed within the die 2, projecting out of the discharge end of the die. The die 2, moreover, has a simple shape whereby it does not cause irregular flow of the molten resin. In this case, even if the mandrel is not projected out from the tip end of the die, object of the invention can be effectively attained, but said projection causes more smooth extrusion.

As the resin is thus extruded and discharged, it becomes free of the pressure exerted thereon in the extruder and thereby foams in a manner such that its cross sectional area expands to a maximum value 6.5 times the discharge aperture area of the die 2, the resin being thus extruded into a tubular foamed structure. Then, while this tubular foamed structure is in a state wherein the foaming agent therewithin is still decomposing and expanding, draft is or is not applied thereto, and surplus foaming gas within this tubular structure is forced out through the gas discharge hole 6 of the mandrel 7 by action such as squeezing.

The downstream end of the tubular foamed structure is then forced through a sizing gate 3, where the resin is pressed and spread to all corners of the sizing gate by the internal gas pressure within the resin similarly as described hereinbefore. The resin thus sized is then directed into a cooling bath 4 to be cooled and set. The cooling in this invention is carried out at the same conditions as those of the cooling bath which has been conventionally adopted in the extruding die device. Generally, cooling is carried out for about two–twenty minutes in the water temperature of which is 8° C.

For example,
Product sectional area—70 x 5—two minutes
Product sectional area—20 x 19.5—five minutes
Product sectional area—180 x 170—twenty minutes
Preferable temperature is 4° C.—20° C.

In cases such as those where the sizes and (or) shapes of the die aperture and the cross section of the desired product differ extremely, the resin is preshaped by means of sizing rolls 5 as described hereinbefore, whereby the forming of resin into its ultimate shape is greatly facilitated.

Because of the above described construction of the extruder 1 and die 2, wherein surplus foaming gas is expelled out of the machine from the interior of the extruded material, the surplus foaming gas accompanying compression of the material is thus discharged even when the hollow foamed material after extrusion is compressed to an extreme degree in the sizing rolls 5 or the sizing gate 3.

Accordingly, irrespective of the magnitude of the deformation ratio, the surface of the product is always smooth, and the corner formation is highly accurate.

The results of experiments which we carried out relative to the effectiveness of the forming procedure with respect to the removal of surplus foaming gas are set forth in Table 4.

TABLE 4

| Sizing gate (mm.) | Area (mm.²) | Die diameter (mm.) | | | | | | | | | |
|---|---|---|---|---|---|---|---|---|---|---|---|
| | | 10.5 | 12 | 15 | 20 | 20 | 30 | 40 | 46 | 64 | 98 |
| | | Mandrel diameter (mm.) | | | | | | | | | |
| | | 6 | 6 | 8 | 15 | 12 | 22 | 32 | 38 | 56 | 90 |
| | | Discharge aperture (mm.²) | | | | | | | | | |
| | | 58 | 85 | 126 | 137 | 201 | 327 | 452 | 528 | 754 | 1,184 |
| 10×7 | 70 | O | O | | | | | | | | |
| 15×7 | 105 | O | O | | | | | | | | |
| 14×8 | 112 | O | O | O | O | | | | | | |
| 20×7 | 140 | O | O | O | O | | | | | | |
| 25×6 | 150 | O | O | O | O | O | | | | | |
| 17×10 | 170 | O | O | O | O | O | | | | | |
| 25×7 | 175 | O | O | O | O | O | O | | | | |
| 14×14 | 196 | O | O | O | O | O | O | | | | |
| 30×7 | 210 | O | O | O | O | O | O | Δ | | | |
| 35×7 | 245 | O | O | O | O | O | O | O | | | |
| 35×9 | 315 | O | O | O | O | O | O | O | Δ | | |
| 35×11 | 385 | O | O | O | O | O | O | O | Δ | Δ | |
| 36×12 | 432 | Δ | O | O | O | O | O | O | O | O | |
| 30×15 | 450 | | O | O | O | O | O | O | O | O | |
| 42×11 | 462 | | O | O | O | O | O | O | O | O | |
| 45×11 | 495 | | O | O | O | O | O | O | O | O | |
| 25×20 | 500 | | O | O | O | O | O | O | O | O | |
| 42×12 | 504 | | O | O | O | O | O | O | O | O | |
| 47×11 | 517 | | O | O | O | O | O | O | O | Δ | |
| 100×12 | 1,200 | | | | | O | O | O | O | O | |
| 150×10 | 1,500 | | | | | | O | O | O | O | O |
| 150×12 | 1,800 | | | | | | | O | O | O | O |
| 150×15 | 2,250 | | | | | | Δ | O | O | O | O |
| 200×20 | 4,000 | | | | | | | | | O | O |

NOTE.—Symbol O indicates accurate corner formation. Symbol Δ indicates accurate corner formation but no stability. Blank spaces indicate conditions under which accurate corner formation cannot be attained.

Resin material extruded from a die 2 of large aperture size or deformed to a great degree in the sizing gate 3 is preshaped by means of sizing rolls 5 as described hereinbefore or is formed by removing gas by using a mandrel 7 having a gas discharge hole 6.

According to present invention, however, with the aim of producing materials with surfaces having the texture of wood and high luster, the molten resin is extruded through a die having a simple aperture shape, such as a circle or ellipse, which will not give rise to irregular or inconsistent flow of the resin, irrespective of the cross sectional shape of the ultimate product. For this reason, when a special article to an extreme degree in cross sectional shape from the above mentioned simple aperture shapes is to be fabricated, a limitation is inevitably imposed on the deformation ratio by the requirement for achieving the aforementioned effectiveness which is an object of the invention.

Accordingly, we have studied this point further and, as a result, have succeeded in solving this problem by dispersing the discharge aperture of the simple-aperture die.

Figure 5:
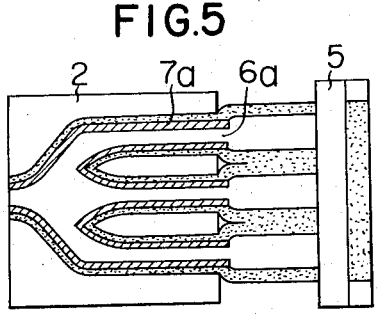
FIGS. 5 and 6 are respectively a side view and view orthogonal thereto illustrating a further embodiment of the invention, in which the extrusion die is a group of eight dies operating in parallel.
Figure 6:
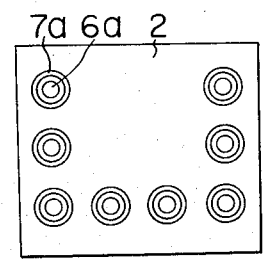
Figure 7:
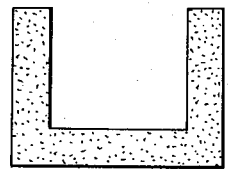
FIG. 7 is a cross section of a shaped foamed material produced by the process indicated in FIGS. 5 and 6.

For the dispersion of the discharge aperture in the forming of special articles according to another embodiment of the invention, use is made of at least two of the above mentioned dies of simple shape in accordance with the shape of the desired product such as a channel, angle, or polygon as illustrated in FIGS. 5, 6, and 7. The foamed materials thus extruded mutually fuse as the foaming progresses and become an integral structure, which is formed into a shape approaching that of the desired product and forced through the sizing gate 3 in the stage wherein the foaming agent is still decomposing within the resin which is expanding. The gas pressure within the molten resin forcefully spreads the resin to all corners of the sizing gate 3, and the article thus formed is immediately introduced into a cooling bath 4 to be cooled and set.

As described above, the present invention provides a method for producing foamed polystyrene materials which comprises the steps of kneading and causing gelation of a polystyrene resin and a foaming agent admixed therewith in an extruder 1, extruding the resulting resin by means of one or more dies 2 of simple shape which will not cause irregular resin flow, foaming of the resin within the extruder 1 being limited to merely the formation of foam nuclei so as to cause free foaming during the process stage wherein pressure is removed, the resin being thus caused to foam to a cross sectional area which is at the most 6.5 times, preferably from 2.5 to 6.5 times, the die aperture area and forcing the foamed material thus extruded, with or without application thereto of draft, while it is the state wherein the foaming agent is still decomposing therewithin, through a sizing gate 3 having a cross sectional area which is from 1.5 to 6.5 times the die aperture area, the foamed resin being forcibly spread to all corners of the sizing gate by gas pressure within the molten resin.

Furthermore, in the case of extrusion through large-size dies or of a high degree of deformation at the sizing gate 3 after extrusion, the molten resin is extruded in a hollow form from a die 2 having a simple configuration such that it will not cause irregularities in the flow of molten resin and having a tubular construction wherein a tubular mandrel 7 projects from the discharge tip of the die 2 and has a central gas discharging hole 6, passing therethrough and through the extruder 1 and communicating with a region outside of the machine, the resin thus extruded being subjected to working such as pressing by sizing rolls 5 or constricting by the sizing gate 3 and thereby being rendered into a solid state. At that time the foamed tubular extrudate is sufficiently melted at its inner surface so that upon bringing such surface in contact they fuse together. The surplus foaming gas generated during this process is expelled out of the machine from the interior because of opening of the surplus gas discharge hole toward region outside of the extruder, or the resin is extruded through a parallel arrangement of dies 2 as described hereinabove in accordance with the shape of the desired product, the expansion of the foamed materials thus extruded being utilized to cause mutual fusion thereof into an integral structure and thereby to form an article of a shape approaching that of the desired product, adverse effects due to the deformation thereby being overcome.

Another feature of the present invention is that it affords mass production of foamed polystyrene materials without a lowering of the machine efficiency since the molten resin is extruded under conditions wherein the resin is permitted to foam freely through one or more dies of simple configuration.

Further features of the invention are that the specific gravity of the finished product can be freely selected within a range (from 0.2 to 0.8) similar to that of wood and that the product has highly desirable characteristics such as accurate corner formation, smooth surface with high lustre, and the appearance and texture of wood and wood products.

In order to indicate still more clearly the nature and utility of the invention, the following examples of specific procedure are set forth, it being understood that these examples are presented as illustrative only and that they are not intended to limit the scope of the invention.

EXAMPLE 1

A mixture formed by admixing 0.5 part of azodicarbonamide with 100 parts of a polystyrene (melting index (MI)=0.58) was kneaded in an extruder at a cylinder temperature ($C_3$) of 181 degrees C. and extruded through a circular die of 3.5 mm. diameter at a temperature ($D_1$) of 129 degrees C. The foamed material thus produced, while still in its state through a sizing gate trapezoidal cross section having an upper side of 4 mm., a lower side of 5 mm., and a height of 4 mm. and was then cooled and set.

The product thus obtained was a foamed polystyrene material of a specific gravity of 0.41 having accurate corner formation and a smooth surface of high lustre and having the appearance and texture of finished wood material.

| Item | Example 1 | Wood (cedar) |
|---|---|---|
| Bend: | | |
| Length [1] direction: | | |
| Bending strength (kg./cm.²) | 243 | 110–665 |
| Bend (mm.) | 14 | 10 |
| Width [2] direction: | | |
| Bending strength (kg./cm.²) | | 34 |
| Bend (mm.) | | 1 |
| Compression: | | |
| 20% (kg./mm.²) | 1.1 | 0.3–0.4 |
| 40% (kg./mm.²) | 2.8 | 0.5–0.7 |
| Hardness (kg./mm.²) | 0.5 | 0.5–0.8 |
| Bending impact (kg.-cm./cm.²) | 4.2 | 19.6 |
| Specific gravity | 0.41 | 0.3–0.4 |
| Nails pulling power: | | |
| Surface direction (kg./cm.) | | 8 |
| Side direction (kg./cm.) | | 12 |

[1] Span 200 mm.
[2] Span 30 mm.

EXAMPLE 2

1.0 part of azodicarbonamide was admixed with 100 parts of a polystyrene (GP:HI=7:3, MI=0.65) to form a mixture, which was kneaded in an extruder at a cylinder temperature ($C_3$) of 210 degrees C and extruded through a circular die of a 64 mm. diameter at a temperature ($D_1$) of 120 degrees C. The foamed material thus produced was preformed with rectangular sizing rolls and, while still in a state wherein the foaming agent was decomposing and expanding therewithin, was forced through a rectangular sizing gate measuring 150 x 15 mm. The foamed resin was then cooled and set.

As a result, a foamed polystyrene material of square-bar cross section and of a specific gravity of 0.50 having accurate corner formation and a wood-like appearance with high lustre was obtained. By additional admixing HI to this resin, a tough material was produced.

| Item | Example 2 | Wood (cedar) |
|---|---|---|
| Bend: | | |
| Length [1] direction: | | |
| Bending strength (kg./cm.²) | 156 | |
| Bend (mm.) | 28 | |
| Width [2] direction: | | |
| Bending strength (kg./cm.²) | 140 | |
| Bend (mm.) | | |
| Compression: | | |
| 20% (kg./mm.²) | 1.5 | |
| 40% (kg./mm.²) | 3.6 | |
| Hardness (kg./mm.²) | 0.47 | |
| Bending impact (kg.-cm./cm.²) | 6.2 | |
| Specific gravity | | |
| Nails pulling power: | | |
| Surface direction (kg./cm.) | 20 | |
| Side direction (kg./cm.) | | |

[1] Span 200 mm.
[2] Span 30 mm.

EXAMPLE 3

A mixture of 0.5 part of azodicarbonamide admixed with 100 parts of a polystyrene (MI=0.58) was kneaded in an extruder at a cylinder temperature $C_3$) of 190 degrees C., and the resulting kneaded mixture was extruded in a tubular form through a tubular die of an aperture diameter of 20 mm. and discharge hole area of 137 mm.² provided with a mandrel with a bore diameter of 15 mm. projecting out from the discharge tip of the die and having a central gas discharging hole comunicating with a region outside of the extruder, the die being at a die temperature ($D_1$) of 120 degrees C.

The tubular foamed material thus extruded, while in the state wherein the foaming agent was still decomposing, and as it was constricted, was forced through a 35 x 7 mm. sizing gate and then was immediately cooled and set.

As a result, a polystyrene material of low degree of foaming having a specific gravity of 0.42 and having a smooth surface, accurate corner formation, and wood-like appearance was obtained.

| Item | Example 3 | Wood (cedar) |
|---|---|---|
| Bend: | | |
| Length [1] direction: | | |
| Bending strength (kg./cm.²) | 240 | |
| Bend (mm.) | 14 | |
| Width [2] direction: | | |
| Bending strength (kg./cm.²) | 220 | |
| Bend (mm.) | 1 | |
| Compression: | | |
| 20% (kg./mm.²) | 1.1 | |
| 40% (kg./mm.²) | 2.8 | |
| Hardness (kg./mm.²) | 0.5 | |
| Bending impact (kg.-cm./cm.²) | 4.2 | |
| Specific gravity | 0.42 | |
| Nails pulling power: | | |
| Surface direction (kg./cm.) | 15 | |
| Side direction (kg./cm.) | 23 | |

[1] Span 200 mm.
[2] Span 30 mm.

EXAMPLE 4

A mixture of 1.0 part of azodicarbonamide admixed with 100 parts of a polystyrene (GH:HI=7:3, MI=0.65) was kneaded in an extruder at a cylinder temperature ($C_3$) of 200 degrees C., and the mixture thus kneaded was extruded in a tubular form through a tubular die of a bore diameter of 15 mm. and a discharge aperture area of 126 mm.² provided with a mandrel of a bore diameter of 8 mm. having a central gas discharge hole which communicated with a region outside of the extruder and projected out of the discharge end of the die, which was at a temperature ($D_1$) of 120° C.

The tubular foamed material thus extruded, while in the state wherein the foaming agent was still decomposing therewithin, and as it was constricted, was pressed and preformed by sizing rolls and forced through a 25 x 20 mm. rectangular sizing gate as surplus foaming gas was expelled from the resin interior through the gas-discharge hole of the mandrel to the region outside of the extruder. The material thus formed was then cooled and set.

As a result, a polystyrene square-bar product of low degree of foaming having a specific gravity of 0.43 and having a smooth surface, accurate corner formation, toughness, and wood-like appearance was obtained.

| Item | Example 4 | Wood (cedar) |
|---|---|---|
| Bend: | | |
| Length [1] direction: | | |
| Bending strength (kg./cm.²) | 160 | |
| Bend (mm.) | 28 | |
| Width [2] direction: | | |
| Bending strength (kg./cm.²) | 142 | |
| Bend (mm.) | 3 | |
| Compression: | | |
| 20% (kg./mm.²) | 1.0 | |
| 40% (kg./mm.²) | 2.5 | |
| Hardness (kg./mm.²) | 0.4 | |
| Bending impact (kg.-cm./cm.²) | 5.3 | |
| Specific gravity | 0.43 | |
| Nails pulling power: | | |
| Surface direction (kg./cm.) | 15 | |
| Side direction (kg./cm.) | 23 | |

[1] Span 200 mm.
[2] Span 30 mm.

EXAMPLE 5

A mixture of 0.5 part of azodicarbonamide admixed with 100 parts of a polystyrene (MI=0.58) was kneaded in an extruder at a cylinder temperature ($C_3$) of 180 degrees C. and extruded through a group of five parallel dies of circular aperture of 3.5-mm. diameter at a die temperature ($D_1$) of 130 degrees C. The materials thus extruded through the five dies were fused into an integral foamed material which, while in a state wherein the foaming agent therewithin was still decomposing and expanding, was forced through a rectangular sizing gate of a width of 42 mm. and a height of 7 mm. The material was then cooled and set.

As a result, a foamed polystyrene plate of low degree of foaming and a specific gravity of 0.47 having accurate corner formation, smooth surface of high lustre, and an appearance resembling that of finished wood was obtained.

| Item | Example 5 | Wood (cedar) |
|---|---|---|
| Bend: | | |
| Length [1] direction: | | |
| Bending strength (kg./cm.$^2$) | 236 | |
| Bend (mm.) | 14 | |
| Width [2] direction: | | |
| Bending strength (kg./cm.$^2$) | 210 | |
| Bend (mm.) | 1 | |
| Compression: | | |
| 20% (kg./mm.$^2$) | 1.1 | |
| 40% (kg./mm.$^2$) | 2.8 | |
| Hardness (kg./mm.$^2$) | 0.5 | |
| Bending impact (kg.-cm./cm.$^2$) | 4.2 | |
| Specific gravity | 0.43 | |
| Nails pulling power: | | |
| Surface direction (kg./cm.) | 15 | |
| Side direction (kg./cm.) | 23 | |

[1] Span 200 mm.
[2] Span 30 mm.

EXAMPLE 6

A mixture of 1.0 part of azodicarbonamide admixed with 100 parts of a polystyrene (GP:HI=7:3, MI=0.65) was kneaded in an extruder at a cylinder temperature ($C_3$) of 185 degrees C. and extruded through a group of eight parallel dies disposed in a channel-like arrangement as shown in FIGS. 5 and 6, each die being circular die of 30 mm. diameter size and provided with an 8 mm. diameter mandrel 7a having a central gas-discharge hole 6a, the die temperature ($D_1$) being 115 degrees C.

The eight material paths were joined by fusion into an integral foamed structure, which was then preformed by sizing rolls and, while it was in a state wherein the foaming agent was still decomposing and expanding therewithin, was forced through a sizing gate having an aperture to produce a foamed material of channel-shaped cross section with a width of 150 mm., a height of 110 mm., and a wall thickness of 1 mm. as illustrated in FIG. 7. The foamed material thus formed was then cooled and set.

As a result, a shaped polystyrene product of low degree of foaming and a specific gravity of 0.49 having accurate corner formation and a wood-like appearance with a smooth surface of high lustre was obtained.

| Item | Example 6 | Wood (cedar) |
|---|---|---|
| Bend: | | |
| Length [1] direction: | | |
| Bending strength (kg./cm.$^2$) | 140 | |
| Bend (mm.) | 28 | |
| Width [2] direction: | | |
| Bending strength (kg./cm.$^2$) | 136 | |
| Bend (mm.) | 3 | |
| Compression: | | |
| 20% (kg./mm.$^2$) | 1.3 | |
| 40% (kg./mm.$^2$) | 3.2 | |
| Hardness (kg./mm.$^2$) | 0.52 | |
| Bending impact (kg.-cm./cm.$^2$) | 5.9 | |
| Specific gravity | 0.49 | |
| Nails pulling power: | | |
| Surface direction (kg./cm.) | 18 | |
| Side direction (kg./cm.) | 25 | |

[1] Span 200 mm.
[2] Span 30 mm.

We claim:

1. In a process for the production of foamed polystyrene articles by heating and kneading in an extruder a polystyrene resin containing a foaming agent admixed therewith ad extruding said resin to cause the resin to foam freely upon release of pressure; the improvement which comprises: extruding the resin, to form a tubular foamed material, through at least one tubular die with an aperture of simple configuration provided with a mandrel, said mandrel having through the center thereof a gas discharge hole communicating with a region outside of the extruder which is adapted to discharge the surplus foaming gas within said tubular foamed material through said gas discharge hole; forcing the tubular foamed material thus extruded through a sizing gate thereby coalescing said tubular foamed material into a final shaped article in a solid state while discharging surplus foaming gas from said tubular foamed material and then cooling the resin to set the same.

2. A process for the production of foamed polystyrene materials, as claimed in claim 1, in which a mandrel projecting out from the tip end of the die is used as the mandrel provided in said die.

3. A process for the production of foamed polystyrene materials, as claimed in claim 1, in which at the process of forcing the extruded tubular foamed material through the sizing gate, said foamed tubular extrudate is maintained to be sufficiently melted at its inner surface so that upon being brought in contact at said sizing member said contact surface fuses together.

4. A process as claimed in claim 1, in which the temperature of the extruder cylinder is of the order of from 110 to 230 degrees C., and the die temperature is of the order of from 110 to 170 degrees C.

5. A process as claimed in claim 1, in which the foaming agent is at least one compound selected from the group consisting of azodicarbonamide, toluenesulphohydrazide, benzene-1, 3-disulphohydrazide, diphenyloxy-4,4'-disulphohydrazide, N,N' - dinitrosopentamethylenetetramine, nitrourea, and tert-butylaminenitryl.

References Cited
UNITED STATES PATENTS

| | | | |
|---|---|---|---|
| 3,413,387 | 11/1968 | Ohsol | 264—46 |
| 3,238,565 | 3/1966 | Jacobs | 264—321 XR |
| 3,538,595 | 11/1970 | Barnes | 264—237 |

FOREIGN PATENTS

| | | | |
|---|---|---|---|
| 263,006 | 12/1963 | Australia | 264—53 |
| 451,864 | 10/1948 | Canada | 264—53 |

PHILIP E. ANDERSON, Primary Examiner

U.S. Cl. X.R.

264—46, 209, 321, DIG. 66; 425—812